United States Patent

Zimmermann et al.

[11] Patent Number: 5,970,251
[45] Date of Patent: Oct. 19, 1999

[54] PROCESS FOR OPTIMIZING PROGRAM PARTS FOR MOTOR VEHICLE CONTROLLERS

[75] Inventors: Jürgen Zimmermann, Vaihingen; Uwe Kleinschmidt, Tamm; Martin Wagener, Ditzingen; Udo Schulz, Vaihingen; Wolfgang Krampe, Renningen, all of Germany

[73] Assignee: Robert Bosch GmbH, Stuttgart, Germany

[21] Appl. No.: 08/750,757

[22] PCT Filed: Jun. 10, 1995

[86] PCT No.: PCT/DE95/00753

§ 371 Date: Dec. 13, 1996

§ 102(e) Date: Dec. 13, 1996

[87] PCT Pub. No.: WO95/34848

PCT Pub. Date: Dec. 21, 1995

[30] Foreign Application Priority Data

Jun. 16, 1994 [DE] Germany .............................. 44 20 939
Jan. 10, 1995 [DE] Germany .............................. 195 00 453

[51] Int. Cl.⁶ .......................... G05B 19/042; G05B 19/05
[52] U.S. Cl. .......................... 395/709; 364/191; 364/192; 365/185.29; 365/185.33; 711/154; 711/163
[58] Field of Search ..................................... 395/821, 842, 395/846; 711/118, 117, 141, 146, 154, 163; 318/567, 568.1; 365/185.05, 185.11, 185.18, 185.29, 185.33, 189.07

[56] References Cited

U.S. PATENT DOCUMENTS 3,798,612  3/1974  Struger et al. .
4,538,224  8/1985  Peterson ..................................... 710/22
5,390,333  2/1995  Pritt et al. .......................... 395/750.06
5,530,673  6/1996  Tobita et al. ....................... 365/185.09

FOREIGN PATENT DOCUMENTS

30 18 275  11/1981  Germany ......................... G65B 15/02
39 17 979  12/1990  Germany ........................... G06F 9/44

Primary Examiner—James P. Trammell
Assistant Examiner—Cuong H. Nguyen
Attorney, Agent, or Firm—Kenyon & Kenyon

[57] ABSTRACT

A process for optimizing data and/or program parts for programmed controllers that can be used, e.g., in motor vehicle controllers. In this process, the controller is connected to an external application device via an interface. Changes in the data and/or program parts to be optimized are entered with the help of the application device. This process is characterized in that, at the beginning of the optimizing process, the data and/or program parts are loaded into the data and/or program read-write memory (e.g., RAM) of the controller. In addition, the process is characterized in that specific changes are made in the control program and/or in the memory and/or register locations of the controller to cause the microprocessor of the controller to access the corresponding data and/or program parts in the data and/or program read-write memory (e.g., RAM) instead of accessing the data and/or program parts in the data and/or program read-only memory (e.g., flash EPROM). For a controller to be used in this process, the controller is provided with a decoder circuit that performs a switch when the microprocessor accesses a certain address or a certain address area. As a result of this switch, instead of accessing the data and/or program parts in the data and/or program read-only memory, the microprocessor accesses the corresponding data and/or program parts in the data and/or program read-write memory.

20 Claims, 6 Drawing Sheets

PROCESS FOR OPTIMIZING PROGRAM PARTS FOR MOTOR VEHICLE CONTROLLERS

FIELD OF THE INVENTION

The present invention relates to a process for optimizing data and/or program parts for programmed controllers.

BACKGROUND OF THE INVENTION

A process is already known from German Patent No. 3,018,275 A1 for optimizing data and/or program parts for programmed controllers. In that process, the control program of a controller is initially copied to a data/program memory unit external to the controller. This memory unit is connected via a serial data transmission line to a control unit that is also external to the controller. The memory unit has a read-write memory that can be accessed by the control unit as well as the controller. Preprogrammed changes are entered into the memory unit via the control unit. The controller runs the program in the memory unit. The program/data changes in the memory unit act directly on the control process carried out by the controller. The effects can be observed directly. The data/programs of the controller are optimized in this way.

German Patent No. 3,917,979 A1 discloses another method of optimizing data and/or program parts for programmed controllers, where the programmed read-only memory of the controller is removed from the controller and a data manipulation device is inserted into the controller instead. The read-only memory removed from the controller is also inserted into the data manipulation device. In addition, the data manipulation device also contains a read-write memory.

The contents of the read-only memory are transferred to the read-write memory at the beginning of an optimization procedure. The controller is connected to an external input device via a serial interface. This input device is used to enter data and make program changes in the read-write memory of the data manipulation device. The data manipulation device also contains a switching device that makes it possible to switch between the read-write memory and the read-only memory. The microprocessor of the controller works either with the read-write memory or with the read-only memory, depending on the switch.

SUMMARY OF THE INVENTION

The process according to the present invention, has the advantage that the standard controller already developed can be used for optimization of data and/or program parts. No circuitry changes need to be made in the standard controller in order to optimize the data and/or program parts. It is not even necessary to open the controller. Thus, the process proposed here is a very inexpensive solution because not only are no circuitry changes needed in the standard controller in order to optimize the data and/or program parts but also the data and/or program parts can be optimized more rapidly because there is no need for complicated rewiring work (i.e., relocating components, insulating and shielding). Furthermore, the susceptibility of the process to errors is reduced. Faulty wiring cannot occur as frequently. The danger of interference due to additional connecting lines is also reduced.

It is also advantageous since it is easy to optimize data and/or program parts for controllers with single-chip microprocessors (where the program/data memory is integrated into the microprocessor). For optimization of data and/or program parts it is necessary only to connect an external application device (such as a suitably programmed personal computer) to the serial interface of the controller via a serial data transmission cable.

It is especially advantageous that certain branches are provided in the control program in the form of conditional branches that lead to a branch only when a certain code word has first been entered via the application device. Thus a switch can be executed between the revised data in the data/program read-write memory and the original data in the data/program read-only memory by means of a simple program query.

It is advantageous for the process if a flash EPROM is used as the program/data read-only memory. Then the program in the flash EPROM can be revised within a very short period of time for a specific application—for example, to provide branches in the program or by simply making certain address changes.

In this case it is also advantageous if the branches are designed as unconditional branches. This prevents the computational burden on the microprocessor that would have resulted from the additional condition queries.

This process can also be used to great advantage in a controller according to another embodiment of the present invention. This controller is characterized in that it contains a decoder circuit designed to perform a switch when the microprocessor accesses a certain address or a certain address area, namely so that instead of accessing the data and/or program parts in the data/program read-only memory, the microprocessor accesses the corresponding data and/or program parts in the data/program read-write memory. In such a controller, no special changes such as branches or modified pointer tables need to be made in the program code of the control program.

The remaining design of the controller according to further embodiment of the present invention has the advantage that the switch can be implemented by a simple operation of writing to the specific register. The write command can be transmitted from an external application device via a serial bus.

Furthermore, it is also advantageous if the decoder circuit of the controller is integrated on a chip together with a memory array switching device. The proposed solution is then associated with only a slight increase in cost because the additional memory array switching device is already provided with many controllers and is designed as a separate component.

BRIEF DESCRIPTION OF THE DRAWINGS

One embodiment of this invention is illustrated in the figures and is explained in greater detail in the following description.

DETAILED DESCRIPTION

Figure 1:
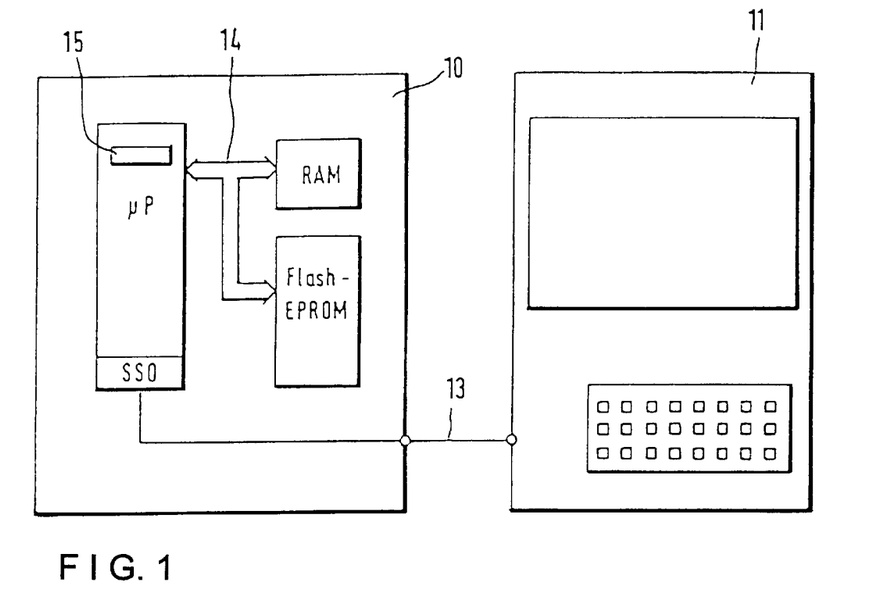
FIG. 1 shows the connection of an external application device to a controller, where the design of the controller is represented by a block schematic.

In FIG. 1, the reference number 10 denotes an engine controller for controlling the ignition and injection in an internal combustion engine of a motor vehicle. The design of such an engine controller is sufficiently known from the prior art, which is why it is discussed below only inasmuch as needed for an understanding of the process described here. Controller 10 contains a microprocessor $\mu P$. Microprocessor $\mu P$ is connected by a suitable bus connection 14 to a data/program read-write memory RAM and a data/program read-only memory, e.g., a flash EPROM. Microprocessor $\mu P$ is also shown with an address register 15 whose function is described below. The actual control program of controller 10 is stored in the data/program read-only memory. In the controller, the data/program read-write memory serves mainly to store variable quantities that are calculated while the control program is running. An external application device 11 is connected to controller 10. The connection is established via a serial data transmission cable 13. Internally in controller 10, the serial data transmission cable 13 is connected to the serial interface SS0 of microprocessor $\mu P$. Any suitably programmed personal computer with a keyboard and a display screen can be used as an external application device 11. In the application of engine controllers, it is appropriate for external application device 11 to be designed as a portable device because then it can easily be accommodated in a motor vehicle during operation of the vehicle. Specifically, the use of a laptop PC can be considered here.

In addition to controller 10, engine control also requires sensors to detect engine status variables such as engine speed, air flow, temperature, etc., actuators to generate the ignition and injection pulses and means for distributing the high-voltage current and finally also a fuel system. The output signals for triggering the ignition and injection output stages are determined in the controller from the processed sensor signals with the help of the microprocessor. This calculation is based on a procedure determined by the control program taking into account engine-specific data such as engine operating characteristics for the injection volume and the ignition angle. Such an engine controller offers the advantage that an engine-specific adjustment can be performed without changing the circuitry of the controller. It can be adapted to a given engine simply by modifying the software provided in the program/data read-only memory, e.g., the flash EPROM. It is often sufficient to revise the data according to the new requirements while keeping the same program, i.e., without changing the computation procedure. Such requirements could include optimizing the exhaust values, minimizing fuel consumption, incorporating comfort features (quiet running), etc.

In an ignition table, ignition angles az are entered for the cylinders of an internal combustion engine, showing all possible operating states of the engine. The operating states of the internal combustion engine are characterized by measured parameters, the engine speed and engine load. The air/fuel ratio lambda for all possible operating states of an internal combustion engine is entered in a lambda table. The operating states of an internal combustion engine are also characterized by the engine speed and load for the lambda table.

Figure 2:
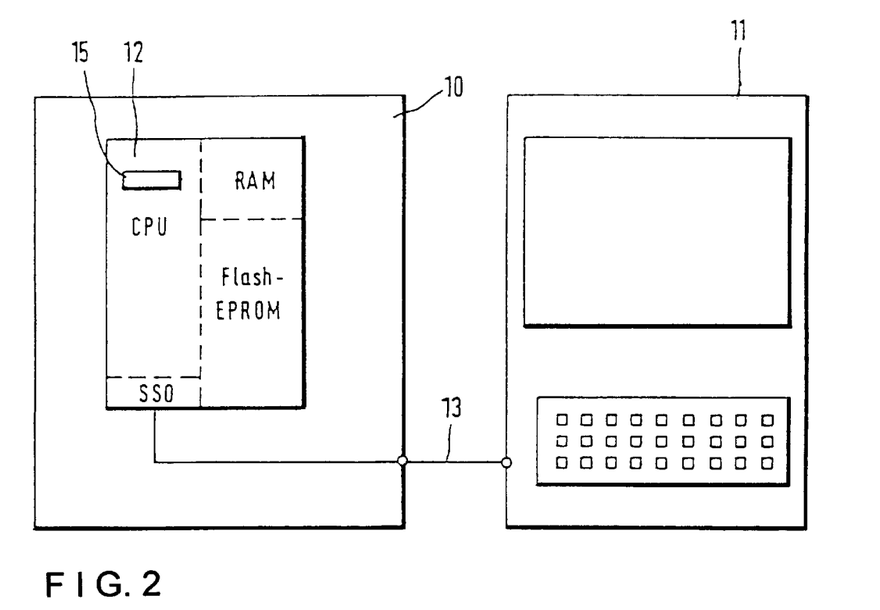
FIG. 2 shows the same design as in FIG. 1, but in this case a single-chip microprocessor has been used in the controller.

FIG. 2 illustrates the same design as in FIG. 1. The same reference numbers are used here as in FIG. 1. The difference in comparison with FIG. 1 is that in this case, a single-chip microprocessor 12 is used in controller 10. The CPU, the data/program read-write memory RAM and data/program read-only memory, e.g., flash EPROM, as well as the serial interface SS0 are integrated on a chip.

Using a flash EPROM in controller 10 offers the advantage that it can be erased and programmed in the circuitry. No separate programming device is needed here, although this is usually the case with EPROMs.

Figure 3:
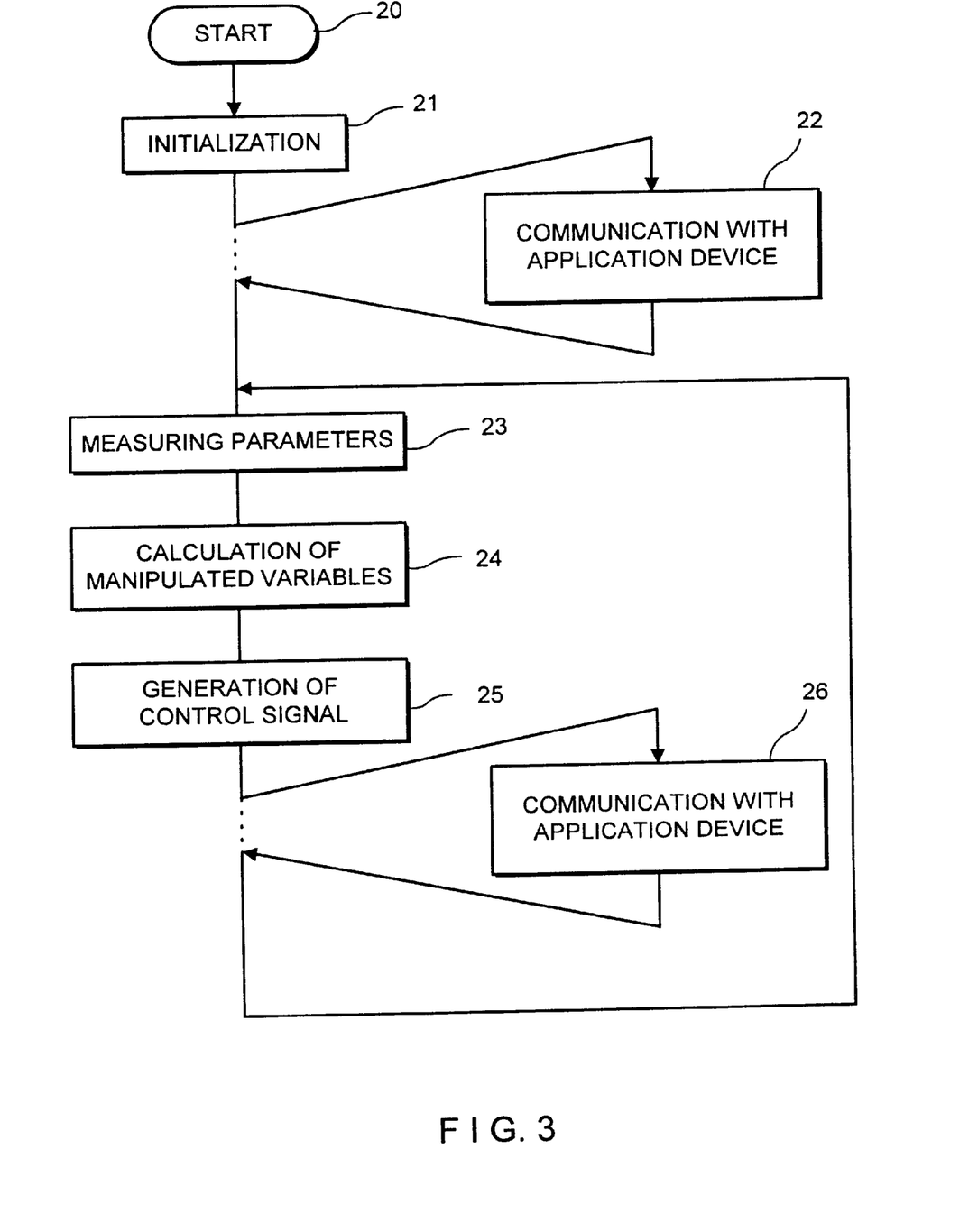
FIG. 3 shows a rough flow chart for the process according to the present invention.

The course of the process according to the present invention for optimizing engine characteristics is explained in greater detail below with reference to FIG. 3. After switching on the power supply voltage in program step 20, controller 10 is initialized. Initializing involves presetting certain registers in microprocessor AP and testing various components of the controller, including the memory contents of the data/program read-only memory. After the initializing procedure in program step 21, there is communication with application device 11. It should be pointed out here, however, that this part of the program does not run cyclically under strict real time conditions. Instead, this part of the program can be regarded as an interrupt program part. It is run only if a suitable request has been sent from application device 11 to controller 10. The first step is for the person executing the application to enter a command into controller 10 via the keyboard to cause the data for the ignition angle table and the lambda table to be copied from the data/program read-only memory to the data/program read-write memory. This takes place in program step 22. Next, the actual control program of controller 10 continues to run. The control program is stored in the data/program read-only memory. The control program can be divided roughly into the following program parts. First, the parameters are measured in program step 23, where engine parameters such as engine speed, engine load, temperature, etc. are determined by analyzing sensor signals. Then the variables and output values are calculated in program step 24. In calculating the variables, the data of the ignition angle table and the lambda table are accessed. This is discussed in greater detail below. Then the control signal for the actuators of the controller is generated in program step 25.

The last part of the program again involves communication with application device 11 in program step 26. Within this part of the program, changes are made in the tables to optimize the control process. These changes are entered in the data/program read-write memory by the microprocessor.

After optionally running this program part 26, the program again branches off to program step 23 where a new control cycle begins. The changes entered in the data/program read-write memory can be retained or revised in the subsequent cycles, depending on whether or not the change is regarded as appropriate. The control program is terminated after optimizing the table data. The changes entered in the data/program read-write memory can be output to application device 11. If the data have been found to be optimal, the data/program read-only memory flash EPROM can be reprogrammed subsequently with the optimized data. Thus the changes are saved permanently in controller 10.

Figure 4:
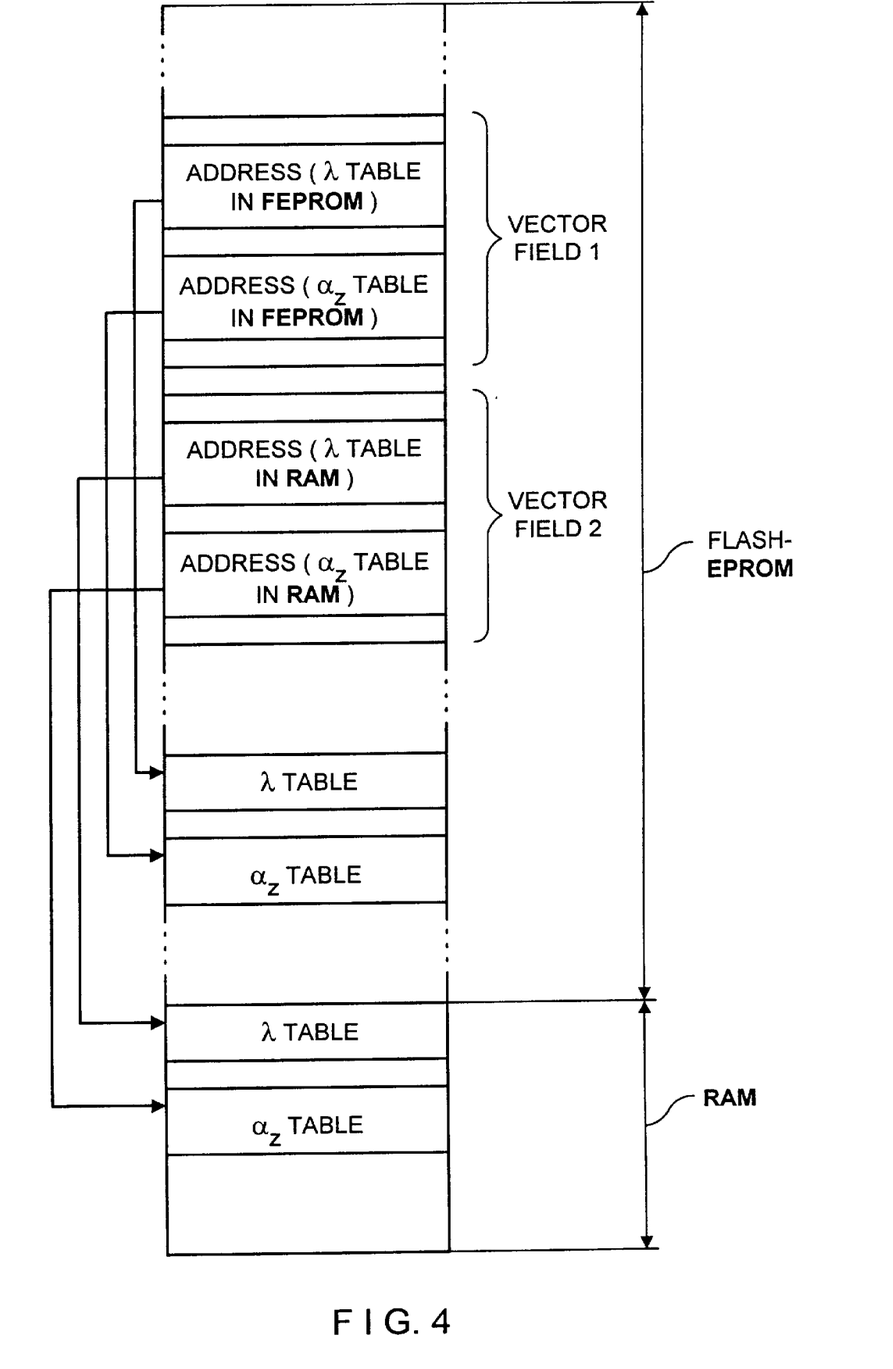
FIG. 4 shows a diagram of the memory division of the controller.

Accessing table data to calculate variables in program part 24 is discussed in greater detail below. FIG. 4 shows details of the memory division during the application of the controllers. The lower part of the address area shown here is reserved for access to the data/program read-write memory. The upper part of the address space is reserved for access to the flash EPROM data/program read-only memory. The data of a table are usually accessed via an address pointer. The address pointers are summarized in a vector field 1. The address pointer for the lambda table indicates the start of the lambda table within the data/program read-only memory. The address pointer for the ignition angle table indicates the beginning of the ignition angle table within the data/program read-only memory. In accessing the corresponding table data, the microprocessor first reads out the contents of the address pointer of the corresponding table and then accesses the corresponding table data in that way. For application of these tables, the data/program read-only memory also contains a second vector field that likewise contains address pointers for a lambda table and an ignition angle table. However, the address pointers indicate a lambda table or an ignition angle table that is entered in the data/program read-write memory, e.g., RAM. The second vector field is programmed into the data/program read-only memory specifically for application of the tables. This is readily possible especially when the data/program read-only memory is designed as a flash EPROM.

Figure 5A:
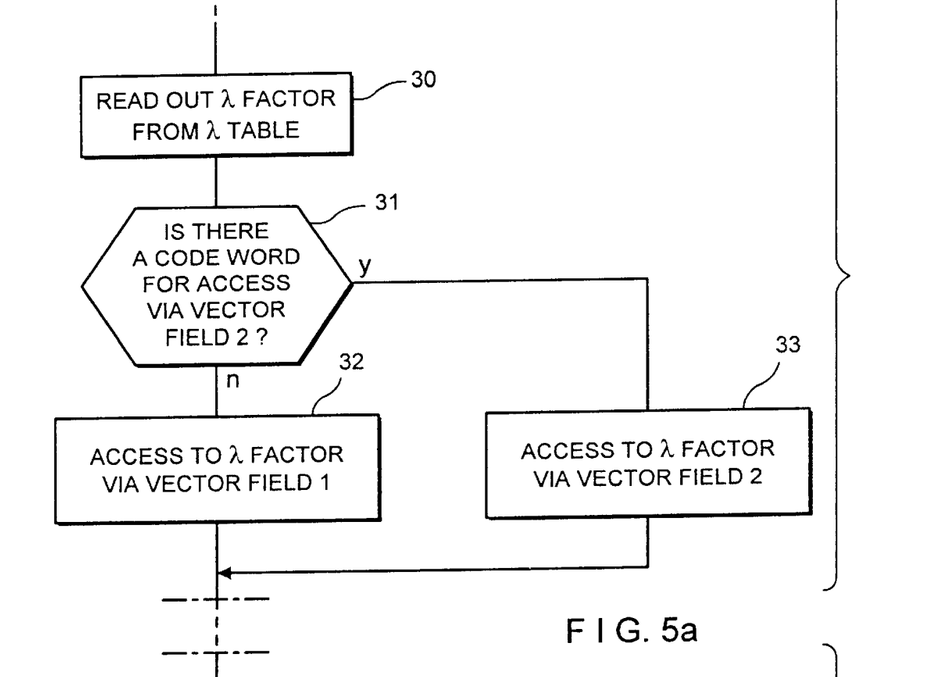
FIG. 5a shows a chart for access to a lambda table of an engine control.

FIG. 5*a* illustrates access to the data of the lambda table for the engine control. In program step 30, the microprocessor of controller 10 is instructed to read out the respective lambda factor for the values determined for the engine speed and engine load from the lambda table. In program step 31, a query is made regarding whether or not there is a specific code word for accessing the lambda table via vector field 2. If this is the case, the lambda table is accessed via the address pointer of the lambda table within vector field 2. This is illustrated in program step 33. If there is no code word for access via vector field 2, it is assumed that access is to be via vector field 1, and the lambda table in the data/program read-write memory is accessed via the proper address pointer. This is illustrated in program step 32. Then the calculation of variables is continued.

Figure 5B:
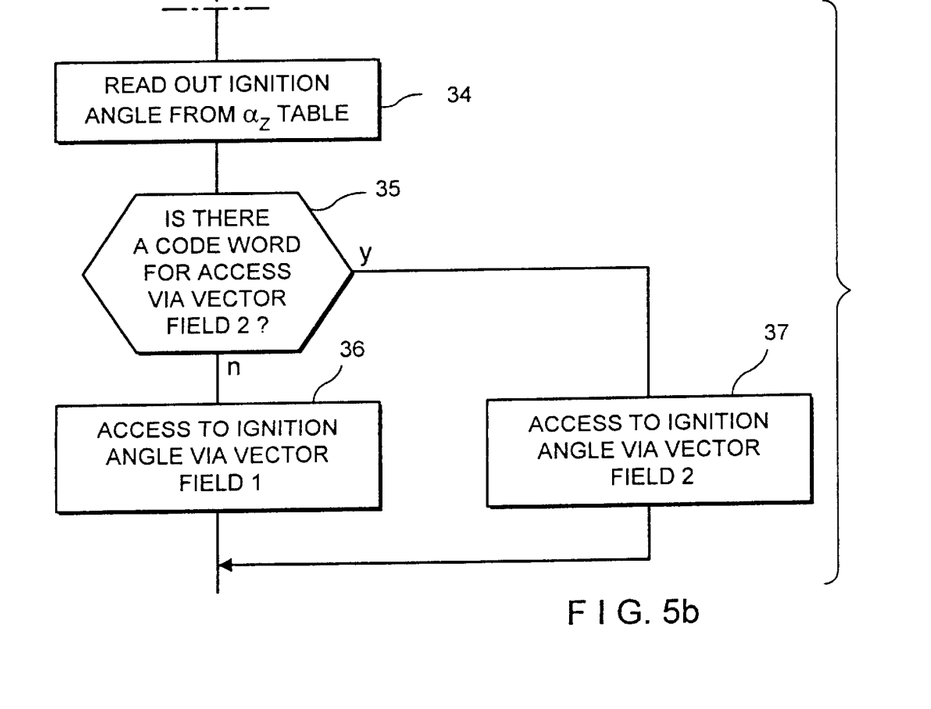
FIG. 5b shows a chart for access to an ignition angle table for an engine control.

FIG. 5*b* shows the access to the ignition angle table. In program step 34 the microprocessor receives the command to read an ignition angle from the ignition angle table. In query 35, a check is performed to determine whether the code word for access is available via vector field 2. If this is the case, access takes place via the proper address pointer in vector field 2 (see program step 37). In the other case, access is possible via the address pointer in vector field 1 (see program step 36).

If a disturbance occurs in carrying out the data changes within the table or if a data change that is inadmissible for operation has been made, the original table data can be accessed immediately through appropriate transmission of the correct code word to controller 10.

The data changes in the data/program read-write memory are made by the microprocessor against the background of its actual control program. Therefore, it is possible to make data changes even while the internal combustion engine is running.

Application device 11 can be conveniently programmed so that the values input are displayed directly in the physical value range, there is an error display when a faulty operation takes place or if the range of an input value is exceeded, an error message is delivered when a certain memory area that is excluded from overwriting is to be overwritten, a real time comparison of various data changes is possible for an immediate evaluation of the changes implemented.

The process according to the present invention is not limited to the embodiment described. Various possible modifications are contemplated. For example, if the storage space in the data/program read-write memory is not sufficient, it is possible to optimize only a single table in this memory and after it has been optimized, another table is optimized in the next step. There need not necessarily be a change in the table data. Instead, it is also possible to just optimize individual table values for the control program. The control parameters for PID control (in idling control, for example) are mentioned as an example. Filter constants or certain threshold values may also be applied accordingly.

The present invention also contemplates that the query of code words for access to a table be eliminated and instead an unconditional branching step be inserted into the control program. This makes it possible to reduce computation time. If only individual parameters or constants are to be applied, it is possible to simply enter other addresses into the control program at those locations where the parameters or constants are accessed, so the microprocessor accesses the data/program read-write memory instead of accessing the data/program read-only memory.

Since data (such as characteristic curves or tables) are often accessed via address pointers in modern controllers, it is very simple to switch to the data to be applied by revising the address pointer entries. Changing addresses can thus also involve changing the entries of address pointers.

The present invention also contemplates that the ability of many microprocessors to perform a switch to different storage areas, namely in that case from the data/program read-only memory to the data/program read-write memory by setting certain register values, may be utilized for the application. For example, the K30 microprocessor from Intel has such a capability. The principle of this switch is as follows. A base address is entered in the special address register 15 at the start of the application. With each data access, the base address is added to the address read out of the control program. In this way the microprocessor ($\mu$P, 12) automatically accesses the data memory and/or the read-write memory (RAM). This makes an application-specific change in the control program unnecessary.

If the microprocessor has different command codes for reading data within the data/program read-only memory in comparison with read access to the data/program read-write memory, then it may become necessary to change these program commands for the application.

It is also possible to optimize certain parts of the control program in the same way. The person performing the application must be sure that the program part to be revised is entered into the data/program read-write memory and is run there at the proper time.

Figure 6:
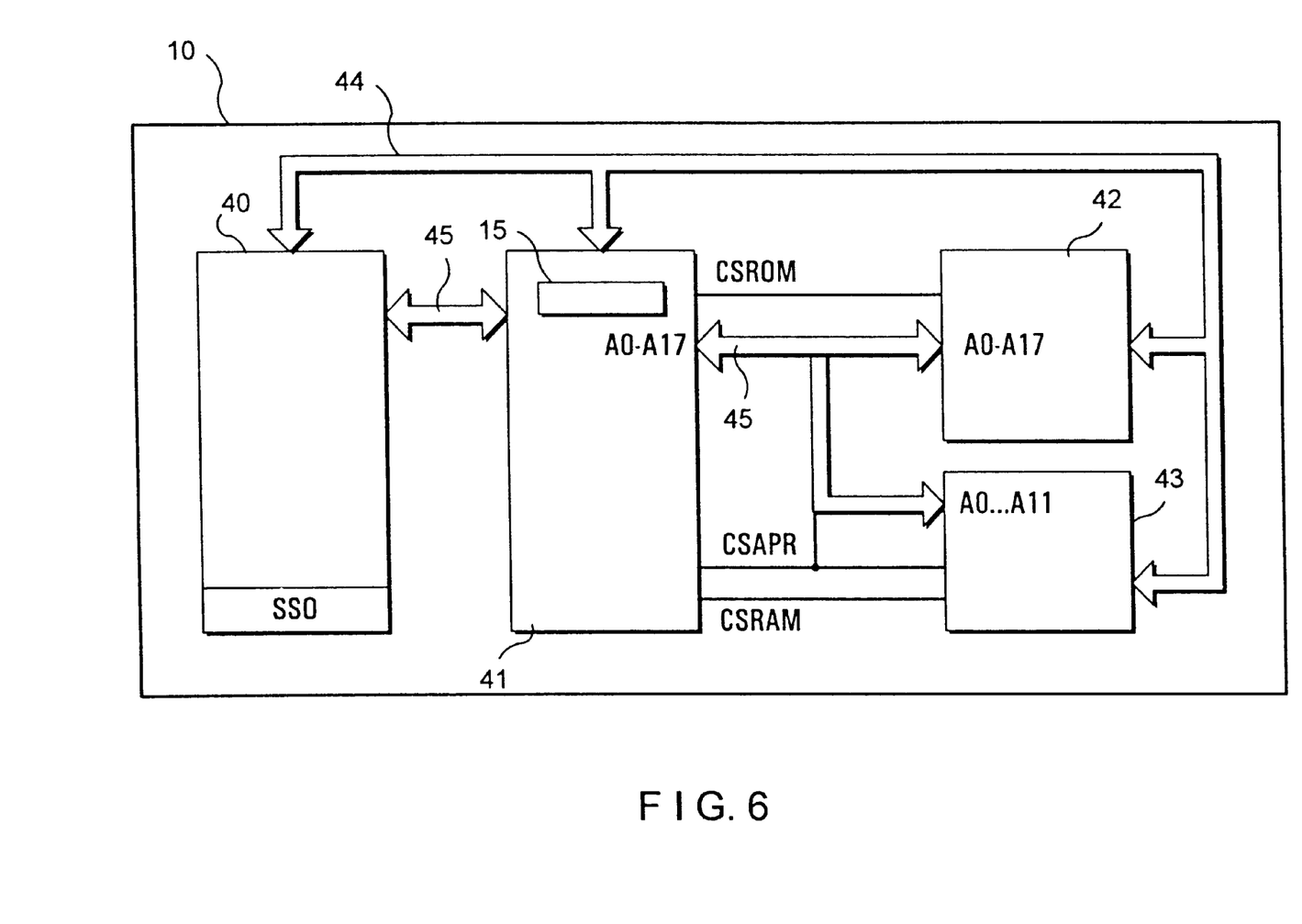
FIG. 6 shows a rough block diagram for a third embodiment of a controller for use in process according to the present invention.

FIG. 6 shows a third embodiment of a controller for use in the process according to the present invention. The controller is designated as 10. Any controller may be used here, as explained above. Controller 10 contains a microprocessor 40, a data/program read-only memory 42 (such as an EPROM), a data/program read-write memory 43 (such as RAM) and a decoder circuit 41. Number 44 denotes the data bus and the control bus of the controller 10. Number 45 denotes the address bus leading from microprocessor 40 to decoder circuit 41. Address bus 45 leads from decoder circuit 41 to data/program read-only memory 42 and data/program read-write memory 43. However, the design is selected so that only address line[s] A0 through A11 lead to the data/program read-write memory. However, address lines A0 through A17 all lead to data/program read-only memory 42. Another special feature consists of the fact that address line A12 is continued separately to data/program read-write memory 43. A chip selector line CSAPR goes from decoder circuit 41 to data/program read-write memory 43. This line is linked to address line A12 of address bus 45. In addition, chip selector lines CSROM and CSRAM go from decoder circuit 41. Chip selector line CSROM leads to data/program read-only memory 42. Chip selector line CSRAM leads to data/program read-write memory 43.

Microprocessor 40 also has a serial interface SS0 which is shown separately and permits serial data transmission with devices that can be connected externally. Decoder circuit 41 also contains address register 15, as mentioned above in conjunction with the other embodiments.

Figure 7:
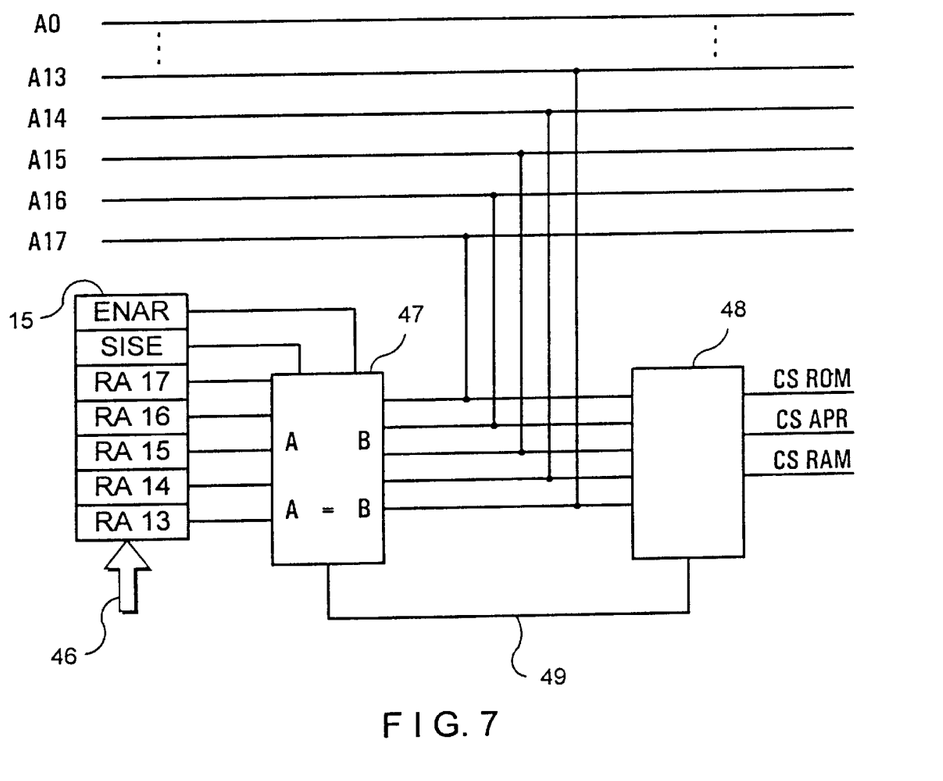
FIG. 7 shows a rough block diagram of the switching device of the controller according to FIG. 6.

The operation of the arrangement described with reference to FIG. 6 is explained in greater detail below in conjunction with FIG. 7. FIG. 7 shows decoder circuit 41 in detail. Decoder circuit 41 contains address register 15. Address register 15 is designed so that it can be written and read by microprocessor 40. Bus connection 46, which serves this purpose, is diagrammed schematically here. Of course, bus 46 may also consist of address bus 45 and data and control bus 44. Address register 15 contains a suitable decoder circuit, so it reacts only to a certain address. Register cells RA13 through RA17 contain address information. They are connected to the corresponding inputs A of comparator circuit 47. The corresponding address lines A17 through A13 of address bus 45 are brought to inputs B of comparator circuit 47. Register locations ENAR and SIZE are connected to the control inputs of comparator circuit 47 via appropriate connecting lines. The output of comparator circuit 47 is connected to an input of an address decoder circuit 48. Address decoder circuit 48 generates the chip selector signals for the data/program read-only memory and the data/program read-write memory 43. For this purpose, address lines A13 through A17 are connected to address decoder circuit 48. For application purposes, another chip selector line CSAPR is provided on address decoder circuit 48. As FIG. 6 shows, chip selector line CSAPR leads to data/program read-write memory 43.

It is assumed below that memory components 42 and 43 are organized in 8-bit words and that the data bus has a width of 8 bits. With its 18 address lines A0 through A17, microprocessor 40 can access an address area of 256 kbytes. The size of the data/program read-only memory 42 is 256 kbytes. The size of the data/program read-write memory is 8 kbytes. Only address lines A0 to A12 are connected to the data/program read-write memory. Thus not all memory locations of the data/program read-only memory 42 are used in the controller described here. Address decoder circuit 48 is designed so that when microprocessor 40 is accessing addresses in the range of 00000H through 3DFFFH, it automatically sets the chip selector line CSROM at "high" and blocks the other chip selector lines CSAPR and CSRAM (in other words, it sets them at "low"). Only when microprocessor 40 accesses addresses in the range of 3E000H through 3FFFFH does address decoder circuit 48 set the chip selector line CSRAM at "high" and block the other chip selector lines CSROM and CSAPR. This is the normal operation of address decoder circuit 48. However, address decoder circuit 48 is also designed for application purposes. For an application, a command is issued to microprocessor 40 by an external communication device via serial interface SS0. This command contains a data word that is to be entered in address register 15. Register locations RA13 through RA17 of address register 15 are occupied by the data word. Any entry may be made in address register 15.

For example, let us assume that the binary value %11000 is entered in register locations RA13 through RA17. If microprocessor 40 selects an address in the range of 30000H through 31FFFH via address bus 45, comparator circuit 47 will ascertain the equality at inputs A and B. It will then set the output A=B at high potential. The high signal is also applied to address decoder circuit 48 via line 49. Consequently, chip selector line CSROM is not activated, as is actually intended in normal operation, but instead chip selector lines CSAPR and CSRAM are set at "high" and chip selector line CSROM is blocked. As a result, microprocessor 40 does not access data/program read-only memory 42 but instead it accesses data/program read-write memory 43. Due to the fact that chip selector line CSAPR accesses the A12 input of data/program read-write memory 43, the upper half of data/program read-write memory 43 can be used for the application while the lower half of the data/program read-write memory continues to be available as a normal read-write memory. Register location ENAR serves for general release of comparator circuit 47. Only when a bit has been placed in register location ENAR is comparator circuit 47 active. Therefore, no chip selector signal CSAPR can be generated in normal operation of the controller. The size of the connected data/program read-write memory can be defined by the SIZE register location. Decoder circuit 41 also allows the use of 32-kbyte data/program read-write memories 43. When the bit has been placed on the SIZE register location, this means that a 32-kbyte data/program read-write memory 43 is used. Then only register locations RA15 through RA17 are compared with the corresponding B inputs of comparator circuit 47. If a bit has not been placed on the SIZE register location, this means that register locations RA13 through RA17 are used to select the memory area to be applied, as described above. However, it must be pointed out in this regard that in the event a larger data/program read-write memory 43 is used, not only address lines A0 through A11 but also address lines A12 and A13 must be connected to this memory. Address line A14 would then be wired like address line A12 in FIG. 6.

Figure 8:
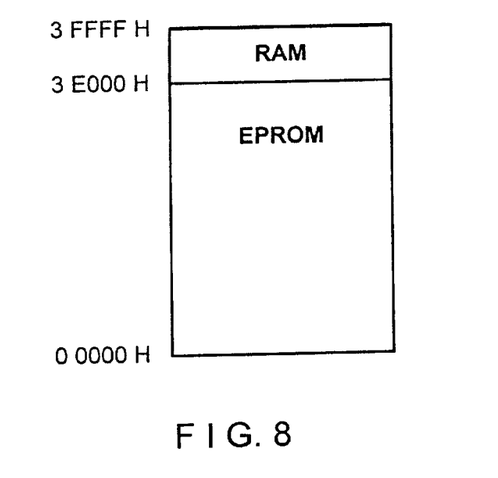
FIG. 8 shows a rough memory partition for the controller according to FIG. 6.

FIG. 8 also shows the memory partition described here for use of the 8-kbyte data/program read-write memory 43. The address area from 00000H through 3DFFFH is provided for data/program read-only memory 42. The upper address area from 3E000H through 3FFFFH is reserved for data/program read-write memory 43.

Thus, with the controller described here, an application can be executed very easily by connecting an external communication device (such as a personal computer) to the serial interface SS0. The application range is selected by writing to address register 15. During the application phase, the range of the data/program read-write memory can be manipulated or optimized. After the completion of the optimization process, the changes recorded by the external communication device are programmed into the original addresses of the data/program read-only memory (EPROM). This can be accomplished by reburning an EPROM or through appropriate algorithms that cause the controller to program the data transmitted from the external communication device or the data available in the manipulated data/program read-write memory 43 into the flash EPROM in the controller.

Decoder circuit 41 can be integrated into a decoder circuit that is present anyway, for example, for memory array switching. This memory array switching function may be performed by a memory array switching device that may be integrated with the decoder circuit 41 on a chip.

The process for optimizing data and/or program parts may also be performed wherein specific changes in the control program concern changes in certain addresses programmed into the control program and/or the insertion of additional branching points.

If there is not enough read-write memory in a controller, another variant is also possible, where an additional read-write memory that is not included in the standard version is added only during the application phase.

What is claimed is:

1. A process for optimizing at least one of data and program parts for a programmed controller, comprising the steps of:
   a. storing a control program in at least one of data and program read-only memory of the programmed controller;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization;
   e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory;
   f. providing branching points in the control program; and
   g. enabling a branching at at least one of the provided branching points by modifying an entry in at least one of the memory location and the register location of the programmed controller.

2. The process according to claim 1, wherein the entry is modified via the application device.

3. A process for optimizing at least one of data and program parts for a programmed controller, comprising the steps of:
   b. storing a control program in at least one of data and program read-only memory of the programmed controller;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization; and
   e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory, wherein the step e. includes the steps of:
      modifying at least one address register of the programmed controller;
      performing an automatic switch in accordance with entries in the at least one address register; and
      accessing the at least one of data and program parts to be optimized in the at least one of data and program read-write memory.

4. The process according to claim 3, wherein the entry is modified via the application device.

5. The process according to claim 3, wherein the programmed controller includes a microprocessor.

6. A process for optimizing at least one of data and program parts for a programmed controller, comprising the steps of:
   a. storing a control program in at least one of data and program read-only memory of the programmed controller;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization;
   e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory; and
   f. loading the at least one of data and program parts to be optimized from the application device into the at least one of data and program read-write memory.

7. A process for optimizing at least one of data and program parts for a programmed controller, comprising the steps of:
   a. storing a control program in at least one of data and program read-only memory of the programmed controller;
   b. coupling the programmed controller to an external aplication device via an interface;
   c. entering at least one modification in the at least one of data and program parts via the application device;
   d. loading the at least one of data and program parts to be optimized into at least one of data and program read-write memory of the programmed controller before optimization;
   e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory; and
   f. copying the at least one of data and program parts to be optimized from the at least one of data and program read-only memory into the at least one of data and program read-write memory.

8. The process according to claim 6, further comprising the steps of:
   optimizing the at least one of data and program parts;
   reprogramming the at least one of data and program read-only memory with the optimized at least one of data and program parts; and
   integrating the optimized at least one of data and program parts into the control program of the programmed controller.

9. A process for optimizing at least one of data and program parts for a programmed controller, comprising the steps of:
   a. storing a control program in at least one of data and program read-only memory of the programmed controller, wherein the at least one of data and program read-only memory includes a flash EPROM;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization; and
   e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory.

10. A process for optimizing at least one of data and program parts for a programmed controller, comprising the steps of:
   a. storing a control program in at least one of data and program read-only memory of the programmed controller;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization; and
   e. modifying at least one of the control program, a read-write memory location and a register location of the prolrammed controller, wherein the programmed controller, in response thereto, accesses the at least one of data and program parts in the at least one of data and program read-write memory instead of accessing the at least one of data and program parts in the at least one of data and program read-only memory, wherein the interface is a serial diagnostic interface.

11. A process for optimizing at least one of data and program parts for a programmed controller, comprising the steps of:
   a. storing a control program in at least one of data and program read-only memory of the programmed controller;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization; and
   e. modifying at least one of the control program, a read-write memory location and a resister location of the programmed controller, wherein the programmed controller, in response thereto, accesses the at least one of data and program parts in the at least one of data and program read-write memory instead of accessing the at least one of data and program parts in the at least one of data and program read-only memory, wherein the interface is a serial interface for data exchange with additional controllers.

12. The process according to claim 11, wherein the serial interface is a controller area network interface.

13. A process for optimizing at least one of data and program parts for a programmed controller, comprising the steps of:
   a. storing a control program in at least one of data and program read-only memory of the programmed controller;
   b. coupling the programmed controller to an external application device via an interface;
   c. entering at least one modification in the at least one of data and program parts via the application device;
   d. loading the at least one of data and program parts to be optimized into at least one of data and program read-write memory of the programmed controller before optimization; and
   e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory, wherein the programmed controller includes a microprocessor.

14. A controller comprising:
   a microprocessor;
   at least one of a data and program read-only memory;
   at least one of a data and program read-write memory; and
   a decoder circuit, wherein, upon the microprocessor accessing at least one of a predetermined address and a predetermined address area, the decoder circuit causes the microprocessor to access a corresponding at least one of data and program parts in the at least one of data and program read-write memory instead of at least one of data and program parts in the at least one of data and program read-only memory.

15. A controller comprising:
   a microprocessor;
   at least one of a data and program read-only memory;
   at least one of a data and program read-write memory;
   a decoder circuit, wherein upon the microprocessor accessing at least one of a predetermined address and a predetermined address area, the decoder circuit causes the microprocessor to access a corresponding at least one of data and program parts in the at least one of data and program read-write memory instead of at least one of data and program parts in the at least one of data and program read-only memory; and
   a memory switching array.

16. The controller according to claim 15, further comprising a serial interface for coupling the controller to an external communication device, wherein the microprocessor receives at least one of read and write commands, for the address register and the at least one of data and program read-write memory, from the external communication device.

17. The controller according to claim 14, wherein the decoder circuit and the memory array switching device are integrated on a chip.

18. A process for optimizing at least one of data and program parts for a programmed controller, comprising the steps of:

a. storing a control program in at least one of data and program read-only memory of the programmed controller;

b. coupling the programmed controller to an external application device via an interface;

c. entering at least one modification in the at least one of data and program parts via the application device;

d. loading the at least one of data and program parts to be optimized into at least one of data and program read-write memory of the programmed controller before optimization; and e. modifying at least one of the control program, a read-write memory location and a register location of the programmed controller, wherein the programmed controller, in response thereto, accesses the at least one of data and program parts in the at least one of data and program read-write memory instead of accessing the at least one of data and program parts in the at least one of data and program read-only memory, wherein the modifying of the control program includes, at least one of modifying addresses programmed into the control program and inserting additional branching points.

19. The process according to claim 18, wherein the additional branching points are conditional branches, and further comprising the step of entering a code word via the application device to cause a branching.

20. The process according to claim 18, wherein the additional branching points are unconditional branches.

* * * * *